March 25, 1930.  C. T. PFLUEGER  1,752,027
FISHING ROD
Filed Jan. 17, 1927
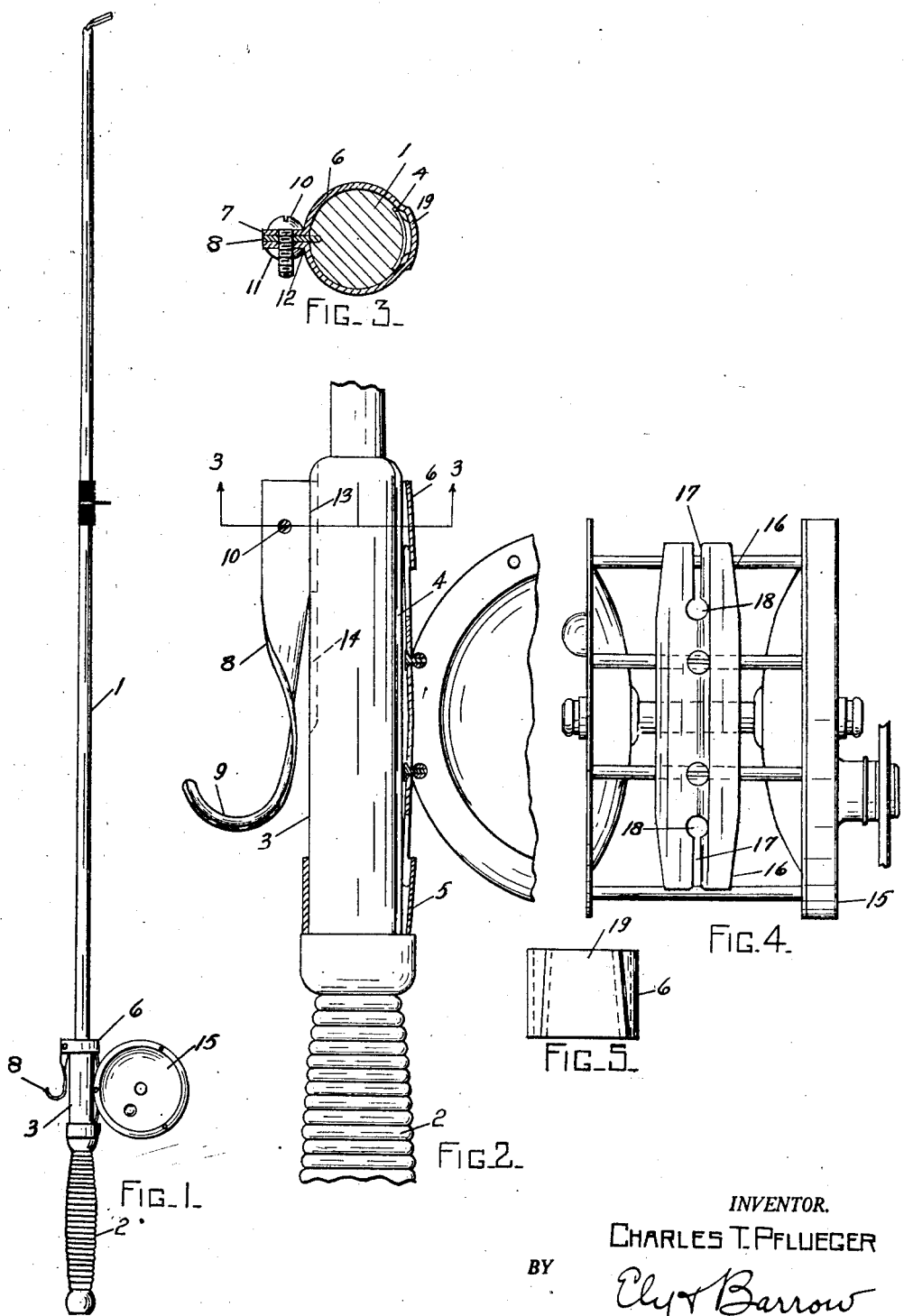
INVENTOR.
CHARLES T. PFLUEGER
BY
*Ely & Barrow*
ATTORNEYS.

Patented Mar. 25, 1930

1,752,027

UNITED STATES PATENT OFFICE

CHARLES T. PFLUEGER, OF AKRON, OHIO, ASSIGNOR TO THE ENTERPRISE MANUFACTURING COMPANY, OF AKRON, OHIO, A CORPORATION OF OHIO

FISHING ROD

Application filed January 17, 1927. Serial No. 161,478.

This invention relates to the design and construction of fishing rods, particularly of light construction, such as used in casting. The objects of the invention are to improve upon the method of securing the fishing reel upon the rod and combining with the reel a finger grip in such a manner as to secure a light, cheap construction and one that will possess certain advantages over similar types at present upon the market. A further object of the invention is to provide a new form of mounting for the finger grip which will maintain it rigid at all times.

Other objects and advantages will be realized by the invention which is here shown and described, it being the purpose of the claims to cover such obvious modifications and changes as fall within the scope of the invention as set forth in the claims appended hereto.

In the drawings:

Figure 1 is a view of a complete rod embodying the invention;

Figure 2 is an enlarged view of the rod at the grip;

Figure 3 is a cross-section on the line 3—3 of Figure 2;

Figure 4 is a view of the under side of the cross plate;

Figure 5 is a detail of the clamping ring.

The fishing rod is indicated by the numeral 1, being provided with a handle or grip 2, directly above which is formed the smooth, cylindrical reel seat portion 3, which is provided along one side with a slot or groove 4 in which the cross plate of the reel is designed to seat.

About the lower end of the reel seat is secured a continuous metal band 5 under which one end of the reel cross plate is received. The other end of the cross plate is received under an adjustable and contractible metal ring 6, the ends of which terminate in parallel wings 7 between which is secured a pivoted finger grip 8 provided at its lower end with a curved trigger-like portion 9. The band and the grip are secured together by a bolt 10, having a nut 11 thereon. The side of the nut 11 next to the band may be flattened slightly at 12 to prevent rotation of the nut. This construction affords an effective and simple mechanism for securely clamping the reel in position and also affords a means for supporting the finger grip. To prevent the rotation of the band 6 about the rod, and to insure proper alignment of the grip upon the rod, the upper end of the finger grip is provided with a feather or key 13 which engages in a key way 14 cut in the rod. As an additional advantage, the contact of the finger grip with the side of the rod prevents rotation of the grip about the bolt 10.

The reel is indicated by the numeral 15, having the usual cross plate 16, the ends of which are received within the reel seats beneath the bands 5 and 6, and which is arched transversely to fit the curvature of the rod. In order to afford a more effective grip for the rod and to enable the cross plate to adjust itself to different curvatures of the reel seats, the ends of the cross plate are divided or split as shown at 17, the splits terminating in rounded apertures 18 forming substantially keyhole slots therein. Either ring may be provided with a tapered socket 19. When the split ends of the cross plate are forced in the sockets 19, the contraction of the ends of the cross plate effects a firm grip to hold the reel securely in position. It will be observed that a very effective and yet very economical finger grip construction has been provided, the finger grip being rigidly secured in place upon bringing the bolt 10 to its final position. In addition it will be noted that the finger grip itself is formed of a single piece of metal bent at its midway point, to provide a radial portion, the edge of which bears against the rod and thereby prevents rotation of the grip, and with a second portion twisted through an angle of 90° to form the finger grip 9.

What is claimed is:

1. A fishing rod having a handle, a reel seat above the handle, a reel having a cross plate resting upon the reel seat, a pair of bands surrounding the reel seat and adapted to enclose the ends of the cross plate, one of said bands being a split band, a bolt to secure the ends of the split band, and a finger grip, the bolt being passed through one end of the finger grip, that portion of the grip adjacent the bolt bearing against the rod and a non-circular surface on the grip bearing against the rod.

2. A fishing rod having a handle, a reel seat above the handle, a reel having a cross plate resting upon the reel seat, a band surrounding the reel seat and the cross plate, and a finger grip carried by the band, the grip having a portion thereof parallel to and contacting with the reel seat beneath the band, whereby the finger grip is maintained substantially parallel to the rod.

3. A fishing rod having a handle, a reel seat above the handle, a reel having a cross plate resting upon the reel seat, a band surrounding the reel seat and the cross plate, a bolt carried by the band, and a finger grip on said bolt, said finger grip having a surface contacting with the reel seat at the bolt, which surface is so shaped as to prevent rotation of the grip about the bolt.

4. A fishing rod having a handle, a reel seat above the handle, a reel having a cross plate resting upon the reel seat, a band surrounding the reel seat and the cross plate, a bolt carried by the band, and a finger grip on said bolt and lying along the rod, a portion of the grip bearing against the rod and being so shaped as to prevent rotation of the grip upon the bolt.

5. A fishing rod having a reel seat thereon, a reel on the seat, a band about the rod to secure the reel in position, and a finger grip carried by the band, a portion of the grip being parallel to and in contact with the rod for a sufficient area to prevent rotation of the grip.

6. A fishing rod having a reel seat thereon, a reel in the seat, a band about the rod to secure the reel in position, a bolt on the band, and a finger grip carried by the bolt and lying along the rod, a portion of the grip being in contact with the rod for a sufficient distance to prevent rotation of the grip about the bolt.

7. A fishing rod having a reel seat thereon, a reel in the seat, a band about the rod to secure the reel in position, a bolt on the band, a finger grip carried by the bolt and lying along the rod, a portion of the grip being in contact with the rod for a sufficient distance to prevent rotation of the grip about the bolt, and a key on the grip to prevent shifting of the grip about the seat.

8. A fishing rod having a reel seat thereon, a reel in the seat, a band about the rod to secure the reel in position, a bolt on the band, and a finger grip carried by the bolt and having a flattened portion positioned radially of the rod, the edge of said portion bearing against the reel seat, whereby rotation of the grip about the bolt is prevented.

9. A fishing rod having a reel seat thereon, a reel on the seat, a band about the rod to secure the reel in position, a bolt on the band, and a finger grip carried by the bolt, said grip being formed of a flat strip of metal having a portion thereof radial to the rod with its edge in contact therewith, and having the other portion twisted through an angle of 90° to form a finger grip portion.

10. A fishing rod having a reel seat thereon, a reel on the seat, a split band about the rod to secure the reel in position, a bolt through the ends of the band to draw them together, and a finger grip carried by the bolt, that portion of the grip adjacent the bolt being parallel to and resting against the seat and thereby presenting the grip from rotation about the bolt.

11. A fishing rod having a reel seat, thereon, a reel on the seat, a split band about the rod to secure the reel in position, a bolt through the ends of the band to draw them together, and a finger grip carried by the bolt, that portion of the grip adjacent the bolt resting against the seat and keyed to the rod and thereby preventing the grip from rotation about the bolt and the band from rotation about the seat.

CHARLES T. PFLUEGER.